Sept. 14, 1954 W. H. BOYCE ET AL 2,689,331
APPARATUS FOR TESTING ELECTROMAGNETIC FIELDS
Filed March 26, 1951 2 Sheets-Sheet 1

INVENTORS
VICTOR E. HARVLIE
WILLFORD H. BOYCE
BY
ATTORNEYS

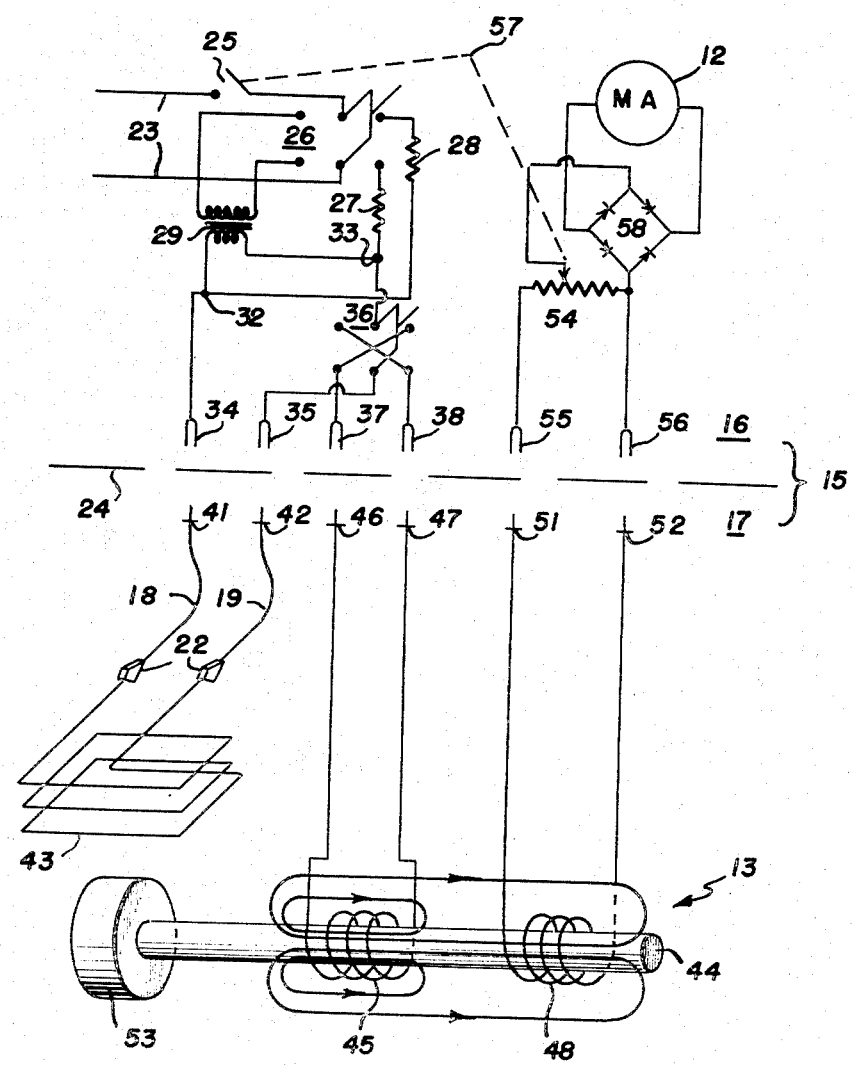

Patented Sept. 14, 1954

2,689,331

UNITED STATES PATENT OFFICE 2,689,331

APPARATUS FOR TESTING ELECTRO-
MAGNETIC FIELDS

Willford H. Boyce and Victor E. Harvlie,
Tacoma, Wash.

Application March 26, 1951, Serial No. 217,651

10 Claims. (Cl. 324—34)

(Granted under Title 35, U. S. Code (1952),
sec. 266)

The invention herein disclosed may be manufactured and used by or for the Government of the United States of America for governmental purposes without the payment of any royalty thereon or therefor.

This invention relates to an electric testing and indicating device, and more particularly to a device for determining characteristics of coil windings of various types.

An important object of the present invention is to provide a novel form of device for determining magnetic characteristics of coil windings, for example the stator windings of motors, to determine if there are shorts, reversed windings, grounds or other undesirable conditions present therein.

A further object, generally speaking, is to provide an instrument with which to locate and analyze trouble in coil windings to determine whether it is desirable to perform a rewinding job, to repair the equipment, to insulate elements of the equipment, etc.

A further object is to provide such a testing and indicating device by which, as an example, the winding errors frequently occurring in rewinding of electric motors may be quickly and easily detected.

A further object is to provide in a device of this character a novel circuit wherein alternating current is supplied to the coil of the equipment to be tested and to a second coil forming a part of the present device, and to provide a third coil inductively related to the second coil and connected to a meter so that the reaction between the fluxes from the coil being tested and the second or reference coil provides an accurate indicator reading to facilitate the testing of the equipment.

A further object is to provide in such a device a novel type having a particularly easily operable probe which facilitates the testing of the equipment.

A further object is to provide such a device wherein the exciting current values are sufficiently small to permit the use of a solid metal probe, which forms the core of the second and third coils, in lieu of the use of a laminated core as normally would be expected.

Other objects and advantages of the present invention will become apparent during the course of the following description.

In the drawing, we have shown one embodiment of the invention. In this showing,

Figure 2 is a diagrammatic view showing the electrical system employed with the device;

Figure 1:
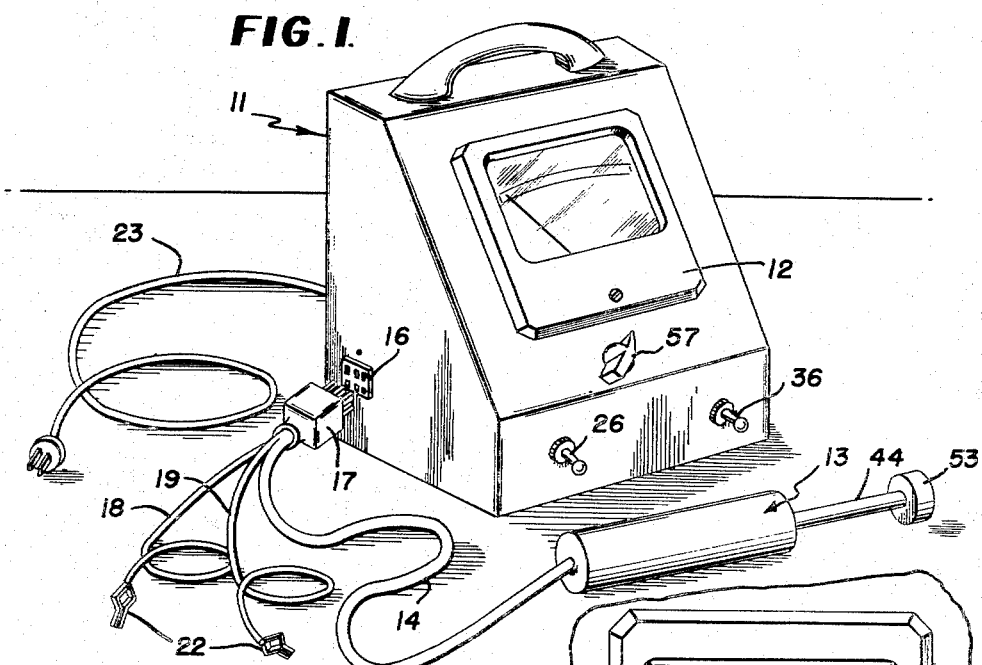
Figure 1 is a perspective view of a modification of the present device.

Referring now to the drawings, there is shown in Figure 1 a cabinet 11 which houses the meter 12 and the operating controls of the device, and the probe 13 which the operator manipulates in the vicinity of the magnetic coil to be tested. The probe 13 is connected to the cabinet 11 by means of the cable 14 through the multiple contact connector 15 which consists of a socket 16 connected to the cabinet and a plug 17 engageable in the socket 16 connected to the cable 14. In addition to the probe 13, a pair of test leads 18 and 19 each equipped with a test clip 22 are also connected to the plug 17, and a power cable 23 is provided to connect the device to a source of alternating current power, such as the conventional 110-volt lighting circuit usually found in factories and shops.

The electrical circuit of the device herein disclosed is shown in Figure 2 in which the apparatus above the dotted line 24 is contained in the cabinet 11 and the apparatus below the dotted line 24 is contained in the probe 13 and the test leads 18 and 19. One wire of the power cable 23 is connected through the switch 25 to a current limiting system which reduces the current traversing the coil to be tested to a low value which will not further injure damaged coils and which will produce only small fluxes in the core structure of the device, thus allowing the use of the device on direct current machinery and eliminating the need for laminated core structures within the device. As illustrated herein, the device is provided with dual ranges selectable by means of the double-pole double throw switch 26. In the "high" range position, the switch 26 is moved to its right-hand position, which connects the instrument to the source of power through the series resistances 27 and 28, while the left-hand position of the switch connects the instrument to the source of power through the transformer 29 which has an output voltage of a few volts. Respective leads from the resistances 27 and 28 are connected to the secondary of the transformer to form an input circuit for the instrument having a single pair of terminals 32 and 33, the terminal 32 being connected to the terminal 34 of the socket 16. The terminal 35 of the socket 16 and the terminal 33 are connected to the input terminals of the reversing switch 36, the output terminals of which are connected to the terminals 37 and 38 of the socket 16.

The test leads 18 and 19 are connected to terminals 41 and 42 of the plug 17 and are adapted to apply an energization voltage to a coil 43 to be tested by the device.

The probe 13 which will be further described hereinafter comprises a magnetic core 44 carrying a primary winding 45 connected to terminals 46 and 47 of the plug 17, a secondary winding 48 connected to terminals 51 and 52, and a roller 53 of magnetic material for a purpose to be described later. The potentiometer 54 is connected to the terminals 55 and 56 of the socket 16, and provides a means for easily adjusting the output voltage from the secondary coil 48. The control 57 indicated by the dotted line operates both the switch 25 and the potentiometer 54.

The output voltage of the potentiometer 54 is applied to the rectifier 58 and the output of the rectifier 58 is impressed on the meter 12 which indicates the magnitude of the voltage impressed on the rectifier. It will be apparent to those skilled in the art that an alternating current milliammeter may be employed rather than the combination of the rectifier 58 and a direct current meter as illustrated.

Figure 3:
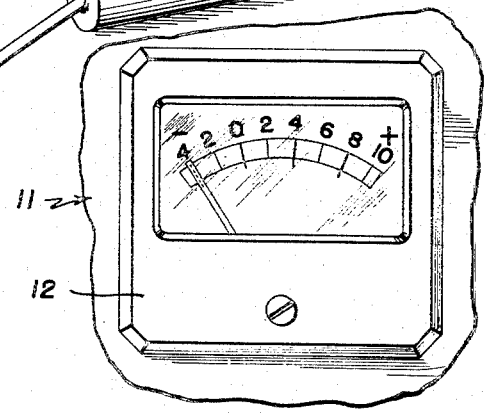
Figure 3 is a face view of the meter dial and pointer.

The meter 12 is provided with a special scale in which the zero position is displaced on the scale, a bias voltage being applied to the meter 12 when the instrument is operated, the magnitude of the bias voltage being approximately one-third the meter range. A suitable form for the scale of a direct current meter is illustrated in Figure 3. It will be noted that the meter has calibrations for both positive and negative readings.

Figure 4:
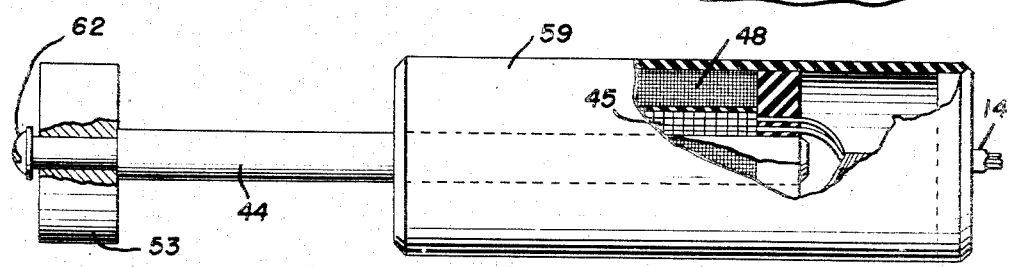
Figure 4 is a side elevation of the probe, parts being broken away and parts being shown in section.

The probe 13, illustrated in Figure 4, consists of a core 44 of magnetic material on which is wound the primary winding 45 and the secondary winding 48 in an inductive relationship to each other. An insulated handle 59 surrounds and protects the windings, and the end of the core projecting from the handle is fitted with the roller 53 which is freely rotatable thereon and which is secured thereto by any suitable means, such as the screw 62.

The instrument is prepared for use by connecting the power cable 23 to a suitable source of alternating current and connecting the coil to be tested to the leads 18 and 19. The operating knob 57 is advanced until the meter reads "zero," the switch 25 being closed as the knob is turned. Assuming the switch 26 is in its right-hand position, a circuit is set up from the switch 25 to the switch 26, through the resistance 28 to terminal 32 to the terminals 34 and 41 to the test lead 18 and through the coil 43 through the test lead 19 and terminals 42 and 35 to one pole of the switch 36, the other pole of which is connected through the resistance 27 and the switch 26 to the remaining side of the supply source. The output of the switch is connected through contacts 37, 46, 38, 47 to the coil 45, which coil induces a voltage in coil 48 which is impressed on the meter 12 through the potentiometer 54 and the rectifier 58.

If the roller 53 is now brought into contact with the magnetic field of the coil 43, a portion of the flux produced by the coil will pass through the core 44 and will also induce a voltage in the coil 48. Since the same current traverses both coils 43 and 45, the voltages produced by the fluxes of these coils will be substantially in phase or out of phase with each other, and will add or subtract directly. Operation of switch 36 will reverse the phase relationship of the fluxes from the coils.

The switch 26 is operated to its left-hand position to reduce the current passing through the coil 43 and hence the voltage induced in coil 48 on the probe 13.

The roller 53 is provided on the probe 13 to provide an easy means of maintaining the probe at a constant distance from the magnetic structure being tested. It therefore eliminates many errors and greatly simplifies the operation of the device.

In the modification herein described, the resistances 27 and 28 may have a resistance of 500 ohms and ordinary 40-watt lamps have been employed with success. The transformer 29 may have a secondary voltage of 8 volts, such a small bell transformer. The coil 45 contained one hundred turns of #20 wire wound on a fiber bobbin two inches long with coil 48 containing four thousand turns of #36 wire wound over it, and the core 44 may be a piece of $\frac{3}{8}''$ mild steel 5'' long with a steel roller $\frac{7}{8}''$ in diameter $\frac{3}{16}''$ thick. The potentiometer 54 has a resistance of 10,000 ohms, and the meter may be a 0–1 milliammeter. The rectifier 58 may be an instrument rectifier of well-known type.

The present instrument may be employed to compare a magnetic device known to be in good condition with a similar defective magnetic device by connecting the two devices in series with the test leads 18 and 19, and touching the probe 13 to both. A low reading from the defective device indicates shorted turns in its coils.

In testing the windings of an induction motor, the test leads 18 and 19 are connected to one pair of phase leads, and the roller 53 rolled around the inside bore of the stator. The meter should indicate alternate north and south poles of equal magnitude, and a pole of low magnitude indicates shorted coils or turns in the coil. The defective coil may be located by the point at which the pole strength deviates from the pattern of the other poles. Similarly, a reversed coil in a winding produces a very low magnitude pole and may even produce a flux reversal.

The testing procedure, of course, is repeated for each of the three stator coils of a three-phase motor, and the same procedure is used in testing single phase motors or any other types of electro-magnetic devices. The device also can be used for testing motor armatures, in which case the armature will be supported in a lathe with brush holders in position and with the leads of the pair 19 and 18 connected with the brushes against the segments. The probe roller 53 will rest on the core of the armature, and various results can be determined such as the pitch of the brushes in relation to the field.

A ground in the winding of an electric motor may be quickly and accurately located by connecting one test lead to the frame of the motor and the other to one end of a winding, so that the winding is energized through the ground. Only a portion of the winding is therefore energized and the ground is located in the vicinity of one end of the energized portion. In order to check the location of the ground it is sometimes desirable to change the connection from one end of the winding to the other, and perform the same test the second time.

The present system differs materially from the usual transformer action in that there are always three coils involved, namely, the coil of the device being tested, the primary coil 45, and the secondary coil 48. The excitations of the coil under test results in an excitation of the primary coil 45 which induces a voltage in the secondary coil of the probe 13 and the adjustment of the meter 12 to a zero point prior to the use of the probe permits accurate readings of the meter when the probe is in operation. The reading on the meter is the result of the reaction between the fluxes from coil being tested and the primary coil in the probe. This reaction influences the secondary coil 48 and its circuit to provide a meter reading, plus or minus, depending upon the relative polarity and strength of the reaction. The device is highly effective for indicating the relative strength and pattern of the magnetic field of the device being tested and provides simple and easily usable means for determining the presence of shorted coils, open circuits, grounds, reversed polarity, improper spacing of coils, or any other fault or irregularity in the electric or magnetic circuits of the piece under test.

It will be readily apparent to those skilled in the art that the device herein described is capable of many modifications without departing from the spirit of the invention. Although only a single modification is described herein, it is intended to cover all modfications and variations falling within the scope of the appended claims and spirit of the present invention.

We claim:

1. An electric testing and indicating system comprising line wires adapted for connection with a source of current, a transformer having a primary coil connected to said line wires, said transformer having a secondary coil and a circuit therefor, and an indicator connected in the circuit of said secondary coil, one of said line wires having two leads for connecting an electro-magnetic device to be tested in series with said primary coil, said transformer having a core projecting therefrom and forming a probe movable in proximity to the device to be tested.

2. In combination with an electro-magnetic device to be tested, a pair of line wires connectible to a source of alternating current, a transformer having a primary coil connected to said line wires, a pair of leads on one of said line wires for connecting the coil of the device line wires to be tested in series with one line wire, said transformer having a secondary coil and a circuit therefor, and an indicator connected to the circuit of said secondary coil to be influenced by current flowing therethrough, said transformer having a core projecting therefrom to form a probe movable over the coil of the device to be tested whereby the flow of flux through said core influences current in the circuit of said secondary coil to vary the readings on said indicator.

3. The combination defined in claim 2 wherein said indicator is connected to said secondary circuit through a rectifier and potentiometer, said indicator including a dial calibrated in opposite directions from a zero point and an indicating needle adjustable to indicate zero, said indicator being manually adjustable for zeroizing said needle when said primary coil is energized by said source, whereupon movement of said probe into the magnetic field to be tested produces measurable fluctuations of said needle from said zero point.

4. An electric testing and indicating system comprising line wires adapted for connection with a source of current, a transformer having a primary coil connected to said line wires, said transformer having a secondary coil and a circuit therefor, and an indicator connected in the circuit of said secondary coil, one of said line wires having two leads for connection with an electro- magnetic device to be tested whereby such device will be in series with said primary coil, said transformer having a core projecting therefrom and provided at its end with a roller forming a part of the flux path of said transformer and adapted to roll over the surface of the device to be tested.

5. An electric testing and indicating system comprising line wires adapted for connection with a source of current, a transformer having a primary coil connected to said line wires, said transformer having a secondary coil and a circuit therefor, an indicator connected in the circuit of said secondary coil, one of said line wires having two leads for connection with an electro-magnetic device to be tested whereby such device will be in series with said primary coil, a manually operable means for reversing the relative polarities of said primary coil and said device to be tested, said transformer having a core projecting therefrom and a forming a probe movable in proximity to the device to be tested, said indicator including an indicating pointer settable and maintainable at a zero index after the device to be tested and said primary coil are energized whereby, upon the use of said probe, current values, plus or minus, in the circuit of said secondary coil are indicated on said dial.

6. In combination with an electro-magnetic device to be tested, a pair of line wires connectible to a source of alternating current, a transformer having a primary coil connected to said line wires, the coil of the device to be tested connected in series with one of said line wires, said transformer having a secondary coil and a circuit therefor, an indicator connected to the circuit of said secondary coil to be influenced by current flowing therethrough, said transformer having a core projecting therefrom to form a probe movable over the device to be tested whereupon flux variations produced in the core vary the current in the circuit of said secondary coil to provide indicator readings, and a reversing switch for reversing the relative polarities of said primary coil and the device to be tested, said indicator being connected to said secondary circuit through a rectifier and a potentiometer, the indicator also including a dial calibrated in opposite directions from a zero index and an indicating needle adjustable to said index when the system is energized and before the probe is moved into proximity to the device to be tested.

7. Apparatus for testing an electro-magnetic device comprising a transformer having primary and secondary coils, an indicator electrically connected with said secondary coil, and line wires for supplying electrical energy into the coil of said primary, said transformer including an outwardly projecting core forming a probe adapted to be brought into proximity with said device, one of said line wires being provided with leads for connecting said primary in series with the device to be tested, whereby said electrical energy may be supplied to said primary through said device.

8. Apparatus for testing an electro-magnetic device comprising a transformer having primary and secondary coils, an indicator electrically connected with said secondary coil, line wires for supplying energy directly into the coil of said primary, and means for limiting said energy supply, said transformer including an outwardly projecting core forming a probe adapted to be brought into proximity with said device, one of said line wires being provided with leads for connecting said primary in series with the device to be tested, whereby said electrical energy may be supplied to said primary through said device.

9. Apparatus for testing an electro-magnetic device having field coils, said apparatus comprising a transformer having primary and secondary coils, an indicator electrically connected with said secondary coil, line wires for supplying electrical energy directly into the coil of said primary, and manually controllable means for reversing the relative polarities of said primary coil and said field coils of the device to be tested, said transformer including an outwardly projecting core forming a probe adapted to be brought into proximity with said device, one of said line wires being provided with leads for connecting said primary in series with the device to be tested, whereby said electrical energy may be supplied to said primary through said device.

10. Apparatus for testing an electro-magnetic device comprising a transformer having a primary and secondary coil, an indicator electrically connected with said secondary coil, line wires for supplying eletrical energy directly into the coil of said primary, said transformer including an outwardly projecting core forming a probe adapted to be brought into proximity with said device, and means for setting and maintaining said indicator at a neutral plus or minus reference point prior to the introduction of said probe into said device, one of said line wires being provided with leads for connecting said primary in series with the device to be tested, whereby said electrical energy may be supplied to said primary through said device.

References Cited in the file of this patent

UNITED STATES PATENTS

| Number | Name | Date |
|---|---|---|
| 1,685,965 | Spooner | Oct. 2, 1928 |
| 2,033,654 | Selquist et al. | Mar. 10, 1936 |
| 2,065,118 | Davis | Dec. 22, 1936 |
| 2,103,179 | Rennau | Dec. 21, 1937 |
| 2,104,643 | Greenslade | Jan. 4, 1938 |
| 2,432,948 | Thompson | Dec. 16, 1947 |
| 2,472,319 | Turner | June 7, 1949 |
| 2,481,282 | Bialous | Sept. 6, 1949 |